(12) United States Patent
Du et al.

(10) Patent No.: US 8,557,016 B2
(45) Date of Patent: Oct. 15, 2013

(54) REDUCING DROSS METHOD OF LEAD-FREE SOLDER

(75) Inventors: Kun Du, Guangdong (CN); Minghan Chen, Guangdong (CN); Xin Chen, Guangdong (CN); Liesong Cai, Guangdong (CN)

(73) Assignee: Guangzhou Solderwell Enterprise Co., Ltd., Guangzhou (CN)

( * ) Notice: Subject to any disclaimer, the term of this patent is extended or adjusted under 35 U.S.C. 154(b) by 117 days.

(21) Appl. No.: 13/125,261

(22) PCT Filed: Jun. 11, 2009

(86) PCT No.: PCT/CN2009/072221
§ 371 (c)(1),
(2), (4) Date: Apr. 20, 2011

(87) PCT Pub. No.: WO2010/060299
PCT Pub. Date: Jun. 3, 2010

(65) Prior Publication Data
US 2011/0219914 A1    Sep. 15, 2011

(30) Foreign Application Priority Data
Nov. 28, 2008    (CN) .......................... 2008 1 0219490

(51) Int. Cl.
*C22B 25/08* (2006.01)
*B23K 31/02* (2006.01)

(52) U.S. Cl.
USPC .............................................. 75/384; 75/690

(58) Field of Classification Search
USPC .............. 75/384, 690; 420/590; 228/102, 103
See application file for complete search history.

(56) References Cited

U.S. PATENT DOCUMENTS 1,931,285 A * 10/1933 Colcord et al. ................. 75/663
7,628,308 B2 * 12/2009 Ojima et al. ................... 228/102

* cited by examiner

*Primary Examiner* — George Wyszomierski
*Assistant Examiner* — Tima M McGuthry Banks
(74) *Attorney, Agent, or Firm* — Jackson IPG PLLC

(57) ABSTRACT

A reducing dross method of lead-free solder includes the steps of: producing master alloy of reducing dross which comprises Sn and 0.1 to 0.8 wt % P; analyzing the percentage of P of the lead-free solder to be modified, in order to reach 0.008 to 0.015 wt % P in the lead-free solder, adding the master alloy into the lead-free solder with the percentage of P less than 0.008 wt % or no P; then sampling the lead-free solder at regular intervals to determine the percentage and the percentage loss of P, if the percentage of P being less than a given value from 0.008 to 0.015 wt %, adding the master alloy to keep the percentage of P as 0.008 to 0.015 wt %.

9 Claims, No Drawings

REDUCING DROSS METHOD OF LEAD-FREE SOLDER

TECHNICAL FIELD

The present invention relates to a reducing dross method of lead-free solder.

BACKGROUND OF THE INVENTION

Since the lead-free process of the solder, there are a variety of lead-free solders appeared on the market. However, disadvantages such as higher percentage of Sn (more than 95 wt %), higher melting point, and higher operating temperature than conventional Sn—Pb solder exists in the lead-free solder, which leads to largely increased amount of dross, impaired welding quality and enormous economic losses.

At present, various measures are adopted in the art to reduce dross with regard to different process features of wave soldering, dip soldering, and hot air leveling, which, for example, comprise (1) being coated with an oxidation resistant oil: the oxidation resistant oil is non-ion surfactant, which reacts through free radicals with ozone to reduce the oxidation of Sn at high temperature, but is not recommended in the art due to the disadvantages of deterioration after long time of use, contaminating the circuit board, big smoke in soldering furnace, and bad atmosphere for worker; (2) nitrogen protection: it has the advantages of high effectiveness and low amount of dross, as well as the disadvantages of increasing solder balls existed on the surface of the circuit board, increased requirement for the purity of nitrogen and large equipment investment; 3) improved wave soldering unit structure—electromagnetic pump: it has the advantages of no intense mechanical agitation, or strong vertex and rolling liquid surface in the furnace, which reduced the phenomenon of oxygen uptake, but has the disadvantages of instable operation, high cost, and increased equipment cost by 30-50% per unit; 4) anti-oxidation elements added to the alloy: P, Ga, Ge, and the like, which has the advantages of good effect, well established technique, easy operation, and cost effective, but has the disadvantages of short anti-oxidation life of product—the so-called not-long-effectiveness, that is, the reducing dross effect varies from goodness in the beginning to none after a short period of time, which largely impairs the practical application effect of the method.

Each of the reducing dross methods has its own scope of application, and the fourth method is considered the best among them taking all factors into consideration. More satisfied effect can be achieved if it is improved in terms of its disadvantages.

SUMMARY OF THE INVENTION

The object of the present invention is to provide a reducing dross method of lead-free solder, which adopts easily operated process, and ensures long and stable reducing dross effect of the lead-free solder.

The object of the present invention can be achieved on the basis of the following reducing dross mechanism:

(1) "skin effect" exists in the distribution of trace elements such as P, Ga, and Ge in liquid solder. Since those elements have much lower Gibbs free energy with $O_2$, they form oxide film earlier than $SnO_2$ film. Furthermore, the oxide film of P, Ga and Ge are dense and firm, so that they cover the surface layer of the liquid solder and block the contact of the solder with $O_2$ in the air, thereby preventing $O_2$ from continuously oxidizing the solder.

(2) the problem of long-effectiveness: due to the "skin effect" the elements P, Ga, and Ge, they always have a higher concentration in the surface layer of the solder than in the inner layer of the solder, so that they are continuously taken away by the dross in the liquid surface and continuously decreased in content, until reducing dross ability fails.

According to above reasons, the present invention provides a reducing dross method of lead-free solder which can keep long effectiveness and be easily operated, comprising the steps of: firstly producing alloy of reducing dross which comprises Sn and 0.1 to 0.8 wt % P by a master alloy process; analyzing percentage of P of the lead-free solder to be modified in a soldering furnace; modifying compositions of the lead-free solder in the soldering furnace, in order to reach 0.008 to 0.015 wt % P of the lead-free solder in the soldering furnace, adding the alloy of reducing dross into the lead-free solder with the percentage of P less than 0.008 wt % or no P; then sampling the lead-free solder in the soldering furnace at regular intervals to determine the percentage and percentage loss of P of the lead-free solder in the soldering furnace; if the percentage of P of the lead-free solder in the soldering furnace being less than a given value from 0.008 to 0.015 wt %, adding the alloy of reducing dross calculated according to the percentage loss of P in an amount needed for maintaining original percentage of P of the lead-free solder in the soldering furnace, to keep the percentage of P of the lead-free solder in the soldering furnace as 0.008 to 0.015 wt %.

In an embodiment of the present invention, the lead-free solder is an solder alloy including Sn and Ag, an solder alloy including Sn and Cu, or an solder alloy including Sn, Ag, and Cu, for example, Sn-3-3.5Ag alloy solder, Sn-0.7Cu alloy solder, Sn-0.7Cu—Ti alloy solder, and Sn-3-3.5Ag-0.5-0.7Cu alloy solder.

In an another embodiment of the present invention, the alloy of reducing dross which comprises Sn and 0.1 to 0.8 wt % P is Sn-0.1-0.8P alloy, Sn-3-3.5Ag-0.1-0.8P alloy, Sn-0.7Cu—Ti-0.1-0.8P alloy or Sn-0.7Cu-0.1-0.8P alloy or Sn-3-3.5Ag-0.5-0.7Cu-0.1-0.8P, and the like.

The alloy of reducing dross is to be designed to ensure the optimum concentration of relevant alloy compositions and P in the soldering furnace, and easy melting of the alloy of reducing dross at normal operating temperature, so that it can be added like a common solder bar without any additional process. The present invention is applicable to the lead-free solder used in electronic field nowadays, and can achieve the effect of the lowest dross amount. The present application is applicable to not only wave soldering, but also to dip soldering and hot air solder leveling (HASL).

DETAILED DESCRIPTION OF THE PREFERRED EMBODIMENT

The following examples use a reducing dross method of lead-free solder comprising the steps of: firstly producing alloy of reducing dross which comprises Sn and 0.1 to 0.8 wt % P by a master alloy process; analyzing percentage of P of the lead-free solder to be modified in a soldering furnace; modifying compositions of the lead-free solder in the soldering furnace, in order to reach 0.008 to 0.015 wt % P of the lead-free solder in the soldering furnace, adding the alloy of reducing dross into the lead-free solder with the percentage of P less than 0.008 wt % or no P; then sampling the lead-free solder in the soldering furnace at regular intervals to determine the percentage and percentage loss of P of the lead-free solder in the soldering furnace; if the percentage of P of the lead-free solder in the soldering furnace being less than a given value from 0.008 to 0.015 wt %, adding the alloy of reducing dross calculated according to the percentage loss of P in an amount needed for maintaining original percentage of P of the lead-free solder in the soldering furnace, to keep the percentage of P of lead-free solder in the soldering furnace as 0.008 to 0.015 wt %. The comparative examples below are performed under the same process conditions as in the above examples, except that no alloy of reducing dross is added into the solder. Unless stated otherwise, the percentages occurred in the following examples are weight percentages.

Example 1

1. Modifying the compositions of the lead-free solder in a soldering furnace:
Adding 0.013 wt % P to Sn-3Ag-0.5Cu lead-free solder with no P, so that the percentage of P of the lead-free solder in the soldering furnace reach 0.013 wt %.
Capacity of the wave soldering furnace: 360 Kg;
Operating temperature of the soldering furnace: 250° C.;
Compositions of the alloy of reducing dross: Sn-3.5Ag-0.5P.
Weight of the alloy of reducing dross to be modified:
Amount of P needed to be supplemented: 360 kg×0.013%=0.0468 kg;
Weight of the alloy of reducing dross needed: 100×0.0468 kg/0.5=9.36 kg.
2. The amount needed to be added every 24 hours:
It was analyzed through a test that the P loss of the lead-free solder in the soldering furnace per 24 hours is 0.001%.
Capacity of the soldering furnace: 360 kg;
Compositions of the alloy of reducing dross: Sn-3.5Ag-0.5P;
Amount of P needed to be supplemented: 360 kg×0.001%=0.0036 kg;
Weight of the alloy of reducing dross supplemented per 24 hours: 100×0.0036 kg/0.5=0.72 kg, The percentage of P of the lead-free solder in the soldering furnace returned to 0.013 wt % after supplementing an alloy of reducing dross of the above weight.

Example 2

1. Modifying the compositions of the lead-free solder in a soldering furnace:
Adding 0.010 wt % P to Sn-3-3.5Ag lead-free solder with no P, so that the percentage of P of the lead-free solder in the soldering furnace reached 0.010 wt %.
Capacity of the wave soldering furnace: 10 Kg;
Operating temperature of the soldering furnace: 260° C.;
Compositions of the alloy of reducing dross: Sn-0.5P.
Weight of the alloy of reducing dross to be modified:
Amount of P needed to be supplemented: 10 kg×0.010%=0.001 kg;
Weight of the alloy of reducing dross needed: 100×0.001 kg/0.5=0.2 kg.
2. The amount needed to be added every 24 hours:
It was analyzed through a test that the P loss of the lead-free solder in the soldering furnace per 24 hours is 0.00086%.
Capacity of the soldering furnace: 10 kg;
Compositions of the alloy of reducing dross: Sn-0.5P;
Amount of P needed to be supplemented: 10 kg×0.00086%=0.000086 kg;
Weight of the alloy of reducing dross supplemented per 24 hours: 100×0.000086 kg/0.5=0.0172 kg, The percentage of P of the lead-free solder in the soldering furnace returned to 0.010 wt % after supplementing an alloy of reducing dross of the above weight.

Example 3

1. Modifying the compositions of the lead-free solder in a soldering furnace:
Adding 0.008 wt % P to Sn-0.7Cu lead-free solder with no P, so that the percentage of P of the lead-free solder in the soldering furnace reached 0.008 wt %.
Capacity of the hot air leveling-soldering furnace: 400 Kg;
Operating temperature of the soldering furnace: 265° C.;
Compositions of the alloy of reducing dross: Sn-0.6P.
Weight of the alloy of reducing dross to be modified:
Amount of P needed to be supplemented: 400 kg×0.008%=0.032 kg;
Weight of the alloy of reducing dross needed: 100×0.032 kg/0.6=5.33 kg.
2. The amount needed to be added every 24 hours:
It was analyzed through a test that the P loss of the lead-free solder in the soldering furnace per 24 hours is 0.003%.
Capacity of the soldering furnace: 400 kg;
Compositions of the alloy of reducing dross: Sn-0.6P;
Amount of P needed to be supplemented: 400 kg×0.003%=0.012 kg;
Weight of the alloy of reducing dross supplemented per 24 hours: 100×0.012 kg/0.6=2 kg, The percentage of P of the lead-free solder in the soldering furnace returned to 0.008 wt % after supplementing an alloy of reducing dross of the above weight.

Example 4

1. Modifying the compositions of the lead-free solder in a soldering furnace:
Adding 0.010 wt % P to Sn-0.7Cu—Ti lead-free solder with 0.003 wt % P, so that the percentage of P of the lead-free solder in the soldering furnace reached 0.013 wt %.
Capacity of the hot air leveling-soldering furnace: 460 Kg;
Operating temperature of the soldering furnace: 255° C.;
Compositions of the alloy of reducing dross: Sn-0.5P.
Weight of the alloy of reducing dross to be modified:
Amount of P needed to be supplemented: 460 kg×0.010%=0.046 kg;
Weight of the alloy of reducing dross needed: 100×0.046 kg/0.5=9.2 kg.
2. The amount needed to be added every 24 hours:
It was analyzed through a test that the P loss of the lead-free solder in the soldering furnace per 24 hours is 0.0011%.
Capacity of the soldering furnace: 460 kg;
Compositions of the alloy of reducing dross: Sn-0.5P;
Amount of P needed to be supplemented: 460 kg×0.0011%=0.00506 kg;
Weight of the alloy of reducing dross supplemented per 24 hours: 100×0.00506 kg/0.5=1.012 kg, The percentage of P of the lead-free solder in the soldering furnace returned to 0.013 wt % after supplementing an alloy of reducing dross of the above weight.

Example 5

1. Modifying the compositions of the lead-free solder in a soldering furnace:
Adding 0.010 wt % P to Sn-3Ag-0.5Cu lead-free solder with 0.002 wt % P, so that the percentage of P of the lead-free solder in the soldering furnace reached 0.012 wt %.
Capacity of the soldering furnace: 360 Kg;
Operating temperature of the soldering furnace: 250° C.;
Compositions of the alloy of reducing dross: Sn-3Ag-0.5Cu-0.4P.

Weight of the alloy of reducing dross to be modified:
Amount of P needed to be supplemented: 360 kg×0.010%=0.036 kg;
Weight of the alloy of reducing dross needed: 100×0.036 kg/0.4=9.0 kg.

2. the amount needed to be added every 48 hours:
It was analyzed through a test that the P loss of the lead-free solder in the soldering furnace per 48 hours is 0.0022%.
Capacity of the soldering furnace: 360 kg;
Compositions of the alloy of reducing dross: Sn-3Ag-0.5Cu-0.4P;
Amount of P needed to be supplemented: 360 kg×0.0022%=0.00792 kg;
Weight of the alloy of reducing dross supplemented per 48 hours: 100×0.00792 kg/0.4=1.98 kg, The percentage of P of the lead-free solder in the soldering furnace returned to 0.012 wt % after supplementing an alloy of reducing dross of the above weight.

Example 6

1. Modifying the compositions of the lead-free solder in a soldering furnace:
Adding 0.008 wt % P to Sn-3Ag-0.5Cu lead-free solder with 0.005 wt % P, so that the percentage of P of the lead-free solder in the soldering furnace reached 0.013 wt %.
Capacity of the soldering furnace: 460 Kg;
Operating temperature of the soldering furnace: 250° C.;
Compositions of the alloy of reducing dross: Sn-0.7Cu—Ti-0.5P.
Weight of the alloy of reducing dross to be modified:
Amount of P needed to be supplemented: 460 kg×0.008%=0.0368 kg;
Weight of the alloy of reducing dross needed: 100×0.0368 kg/0.5=7.36 kg.

2. The amount needed to be added every 48 hours:
It was analyzed through a test that the P loss of the lead-free solder in the soldering furnace per 48 hours is 0.0023%.
Capacity of the soldering furnace: 460 kg;
Composition of the alloy of reducing dross: Sn-0.7Cu—Ti-0.5P;
Amount of P needed to be supplemented: 460 kg×0.0023%=0.01058 kg;
Weight of the alloy of reducing dross supplemented per 48 hours: 100×0.01058 kg/0.5=2.116 kg, The percentage of P of the lead-free solder in the soldering furnace returned to 0.013 wt % after supplementing an alloy of reducing dross of the above weight.

The results for examples 1-6 and comparative examples were listed in the table below:

| No. | Alloy of reducing dross | Test time (h) | Total dross (kg) | Reducing dross rate % |
|---|---|---|---|---|
| comparative example1 | absent | 120 | 66 | — |
| example1 | present | 120 | 27.5 | 58.3 |
| comparative example2 | absent | 120 | 3.4 | — |
| example2 | present | 120 | 0.92 | 72.6 |
| comparative example3 | absent | 120 | 93.7 | — |
| example3 | present | 120 | 65.3 | 30.2 |
| comparative example4 | absent | 96 | 41.3 | — |
| example4 | present | 96 | 21.7 | 47.5 |
| comparative example5 | absent | 96 | 49.2 | — |
| example5 | present | 96 | 24 | 51.2 |
| comparative example6 | absent | 96 | 31.4 | — |
| example6 | present | 96 | 23.1 | 26.4 |

In summary, the present illustrates the above preferred embodiments. However, it should be noted that various changes and modifications can be made by those skilled in the art. Therefore, such changes and modifications should be covered in the scope of protection of the present invention, without departing from the scope of the present invention.

What is claimed is:

1. A reducing dross method of lead-free solder, comprising the steps of:
    firstly producing alloy of reducing dross by a master alloy process, the alloy of reducing dross comprising Sn and 0.1 to 0.8 wt % P;
    analyzing a percentage of P of the lead-free solder to be modified in a soldering furnace;
    if the percentage of P of the lead-free solder is less than 0.008 wt %, adding the alloy of reducing dross into the lead-free solder until the percentage of P of the lead-free solder in the soldering furnace reaches within 0.008 to 0.015 wt % P;
    then sampling the lead-free solder in the soldering furnace at regular intervals to determine the percentage and a percentage loss of P of the lead-free solder in the soldering furnace;
    if the percentage of P of the lead-free solder in the soldering furnace is less than 0.008 wt %, adding the alloy of reducing dross calculated according to the percentage loss of P in an amount needed for maintaining the percentage of P of the lead-free solder as 0.008 to 0.015 wt %.

2. The reducing dross method of lead-free solder according to claim 1,
    wherein the lead-free solder is an alloy solder including Sn and Ag.

3. The reducing dross method of lead-free solder according to claim 1,
    wherein the lead-free solder is an alloy solder including Sn and Cu.

4. The reducing dross method of lead-free solder according to claim 1,
    wherein the lead-free solder is an alloy solder including Sn, Ag and Cu.

5. The reducing dross method of lead-free solder according to claim 1,
    wherein the lead-free solder is Sn-3-3.5Ag-0.5-0.7Cu alloy solder.

6. The reducing dross method of lead-free solder according to claim 1,
    wherein the alloy of reducing dross is Sn-0.1-0.8P alloy.

7. The reducing dross method of lead-free solder according to claim 1,
    wherein the alloy of reducing dross is Sn-3-3.5Ag-0.1-0.8P alloy.

8. The reducing dross method of lead-free solder according to claim 1, wherein the alloy of reducing dross is Sn-3-3.5Ag-0.5-0.7Cu-0.1-0.8P alloy.

9. The reducing dross method of lead-free solder according to claim 1,
wherein the regular intervals is 8 to 48 hours.

* * * * *